(12) United States Patent
Kim et al.

(10) Patent No.: US 11,749,173 B2
(45) Date of Patent: Sep. 5, 2023

(54) ELECTRONIC DEVICE CONFIGURED TO QUICKLY UPDATE SCREEN UPON RECEIVING INPUT FROM PERIPHERAL DEVICE

(71) Applicant: Samsung Electronics Co., Ltd., Suwon-si (KR)

(72) Inventors: Seungryeol Kim, Suwon-si (KR); Minwoo Lee, Suwon-si (KR); Kwangtai Kim, Suwon-si (KR); Donghwy Kim, Suwon-si (KR); Donghyun Yeom, Suwon-si (KR); Seoyoung Lee, Suwon-si (KR); Juseok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/860,716

(22) Filed: Jul. 8, 2022

(65) Prior Publication Data

US 2023/0016948 A1    Jan. 19, 2023

Related U.S. Application Data

(63) Continuation of application No. PCT/KR2022/009046, filed on Jun. 24, 2022.

(30) Foreign Application Priority Data

Jul. 15, 2021 (KR) .......... 10-2021-0093101

(51) Int. Cl.
| | | |
|---|---|---|
| *G09G 3/20* | (2006.01) | |
| *G06F 3/041* | (2006.01) | |
| *G06V 40/13* | (2022.01) | |
| *G06F 3/023* | (2006.01) | |
| *G06F 3/0354* | (2013.01) | |

(52) U.S. Cl.
CPC ......... *G09G 3/2096* (2013.01); *G06F 3/0416* (2013.01); *G06F 3/023* (2013.01);
(Continued)

(58) Field of Classification Search
None
See application file for complete search history.

(56) References Cited

U.S. PATENT DOCUMENTS

| | | |
|---|---|---|
| 10,852,885 B2 | 12/2020 | Lin et al. |
| 2013/0155036 A1 | 6/2013 | Kim et al. |

(Continued)

FOREIGN PATENT DOCUMENTS

| | | |
|---|---|---|
| KR | 10-2013-0070765 A | 6/2013 |
| KR | 10-2015-0018029 A | 2/2015 |

(Continued)

OTHER PUBLICATIONS

International Search Report dated Sep. 29, 2022, issued in International Application No. PCT/KR2022/009046.

*Primary Examiner* — Stephen T. Reed
(74) *Attorney, Agent, or Firm* — Jefferson IP Law, LLP

(57) ABSTRACT

An electronic device that quickly updates a screen when receiving an input from a peripheral device is provided. The electronic device includes a display driver integrated circuit (DDIC) configured to output a tearing effect (TE) signal having a designated frequency, and a processor configured to control the peripheral device, a display, and the DDIC and to transmit image data to the DDIC in response to the TE signal, wherein the DDIC is configured to output the TE signal at a first frequency, receive an interrupt signal from the peripheral device while the TE signal is output at the first frequency, output the TE signal at a second frequency in response to the interrupt signal, the second frequency being greater than the first frequency, receive image data updated (Continued)

by the processor based on the TE signal output at the second frequency, and drive the display to display the received image data.

20 Claims, 10 Drawing Sheets

(52) U.S. Cl.
CPC .................. *G06F 3/03545* (2013.01); *G06F 2203/04108* (2013.01); *G06V 40/13* (2022.01); *G09G 2354/00* (2013.01); *G09G 2370/00* (2013.01)

(56) References Cited

U.S. PATENT DOCUMENTS

| | | |
|---|---|---|
| 2015/0015591 A1 | 1/2015 | Oh et al. |
| 2015/0042668 A1 | 2/2015 | Jeon |
| 2015/0130824 A1 | 5/2015 | Lee et al. |
| 2015/0309649 A1 | 10/2015 | Lee |
| 2020/0005723 A1 | 1/2020 | Kim et al. |
| 2020/0092516 A1 | 3/2020 | Moon et al. |
| 2020/0160792 A1 | 5/2020 | Park et al. |
| 2021/0280148 A1* | 9/2021 | Liu ........................ G09G 5/006 |

FOREIGN PATENT DOCUMENTS

| | | |
|---|---|---|
| KR | 10-2015-0055324 A | 5/2015 |
| KR | 10-2015-0081749 A | 7/2015 |
| KR | 10-2015-0122962 A | 11/2015 |
| KR | 10-2020-0033084 A | 3/2020 |
| KR | 10-2021-0098259 A | 8/2021 |
| KR | 10-2521898 B1 | 4/2023 |
| KR | 10-2529503 B1 | 5/2023 |

* cited by examiner

ELECTRONIC DEVICE CONFIGURED TO QUICKLY UPDATE SCREEN UPON RECEIVING INPUT FROM PERIPHERAL DEVICE

CROSS-REFERENCE TO RELATED APPLICATION(S)

This application is a continuation application, claiming priority under § 365(c), of an International application No. PCT/KR2022/009046, filed on Jun. 24, 2022, which is based on and claims the benefit of a Korean patent application number 10-2021-0093101, filed on Jul. 15, 2021, in the Korean Intellectual Property Office, the disclosure of which is incorporated by reference herein in its entirety.

TECHNICAL FIELD

The disclosure relates to an electronic device including a display. More particularly, the disclosure relates to an electronic device configured to quickly update a screen upon receiving an input from a peripheral device.

BACKGROUND ART

An electronic device may display, through a display panel, various screens, the screens including images and text.

Mobile industry processor interface, display serial interface (MIPI DSI) is a display standard for a portable electronic device, such as a smartphone, a tablet personal computer, or a smart watch.

MIPI DSI is a display standard and may include a video mode and a command mode.

In the video mode, a host (for example, processor) may transmit image frames to a display driver integrated circuit (DDIC) in real time. In the video mode, for example, even if an image to be displayed on a display panel is a still image, the host may repeatedly transmit an identical image frame corresponding to the still image to the DDIC.

The beginning of image frame transmission in the command mode may be controlled by a tearing effect (TE) signal output from the DDIC. The host (for example, processor) may control the transmission timing (for example, refresh rate) of an image frame transmitted to the DDIC, based on the TE signal output from the DDIC.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Electronic devices have been developed to have increased display panel resolutions and to support high-frequency driving (for example, 60 Hz-120 Hz).

In line with expanding ranges of utilization of electronic devices, there is a need for continuous research/development such that electronic devices not only simply display information, but also provide various user experiences or user interaction at higher response rates.

Aspects of the disclosure are to address at least the above-mentioned problems and/or disadvantages and to provide at least the advantages described below. Accordingly, an aspect of the disclosure is to provide an electronic device configured to quickly update a screen upon receiving an input from a peripheral device.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a peripheral device, a display, a display driver integrated circuit (DDIC) configured to drive the display and to output a tearing effect (TE) signal having a designated frequency, and a processor configured to control the peripheral device, the display, and the DDIC and to transmit image data to the DDIC in response to the TE signal, wherein the DDIC is configured to output the TE signal at a first frequency, receive an interrupt signal from the peripheral device while the TE signal is output at the first frequency, output the TE signal at a second frequency in response to the interrupt signal, the second frequency being greater than the first frequency, receive image data updated by the processor based on the TE signal output at the second frequency, and drive the display to display the received image data.

In accordance with another aspect of the disclosure, a method of an electronic device is provided. The method includes outputting, by the DDIC, the TE signal at a first frequency, receiving, by the DDIC, an interrupt signal a peripheral device of the electronic device while outputting the TE signal at the first frequency, outputting, by the DDIC, the TE signal at a second frequency in response to the interrupt signal, the second frequency being greater than the first frequency, receiving, by the DDIC, image data updated by the processor based on the TE signal output at the second frequency, and driving, by the DDIC, the display to display the received image data.

In accordance with another aspect of the disclosure, an electronic device is provided. The electronic device includes a display configured to include a touch sensor, a DDIC configured to drive the display and to output a TE signal having a designated frequency, and a processor configured to control the display and the DDIC and to transmit image data to the DDIC in response to the TE signal, wherein the touch sensor transmits an interrupt signal to the DDIC when a user's touch input or a hovering input to the display is detected, and the DDIC is configured to output the TE signal at a first frequency, receive an interrupt signal from the touch sensor while the TE signal is output at the first frequency, output the TE signal at a second frequency in response to the interrupt signal, the second frequency being greater than the first frequency, receive image data updated by the processor based on the TE signal output at the second frequency, and rive the display to display the received image data.

Advantageous Effects of Invention

According to various embodiments of the disclosure, a screen may be quickly updated upon receiving an input from a peripheral device, thereby providing more improved user experiences and user interaction functions.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
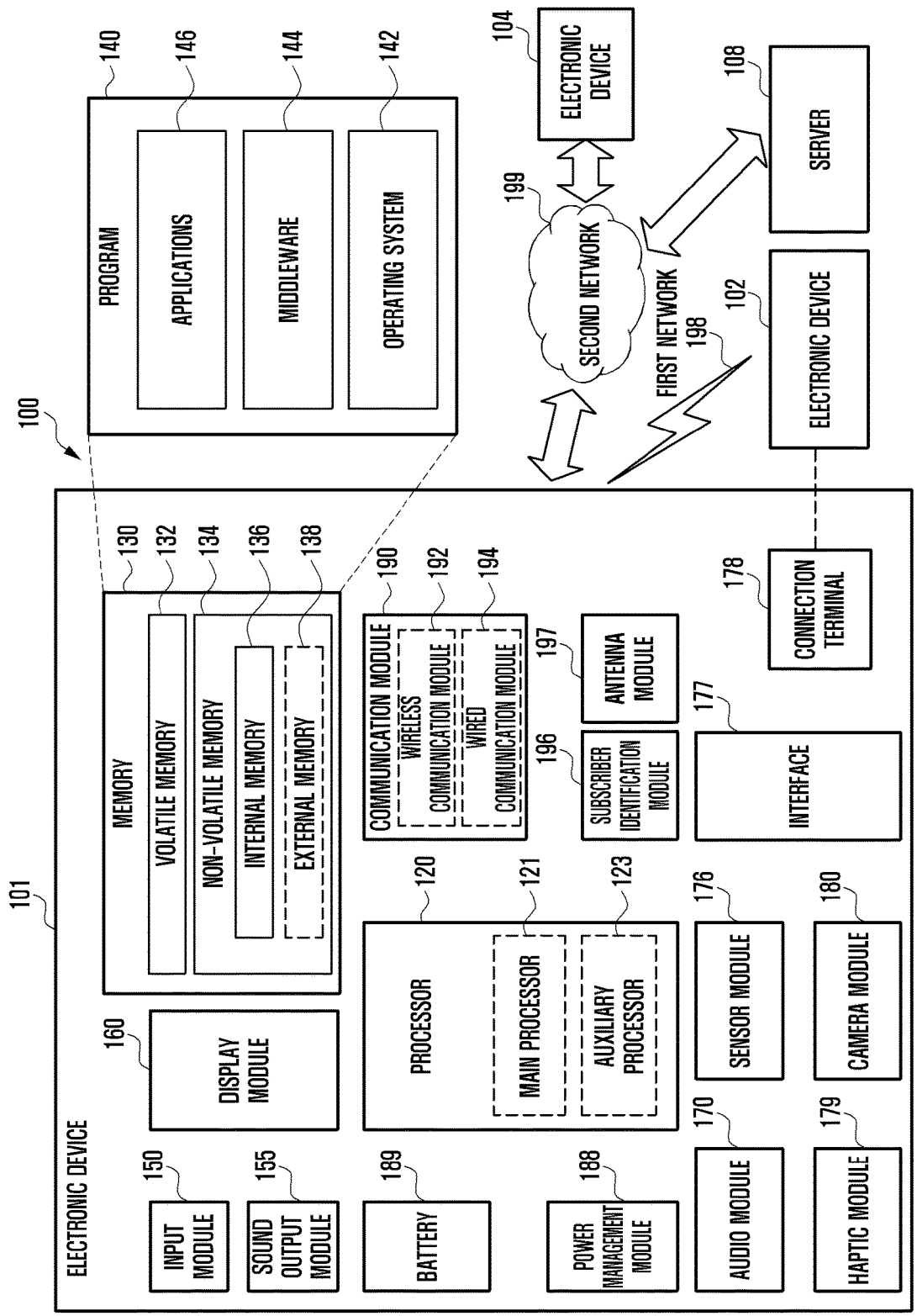
FIG. 1 is a block diagram illustrating an electronic device in a network environment according to an embodiment of the disclosure.

FIG. 1 is a block diagram illustrating an electronic device \ in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter wave (mmWave band)) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in another aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
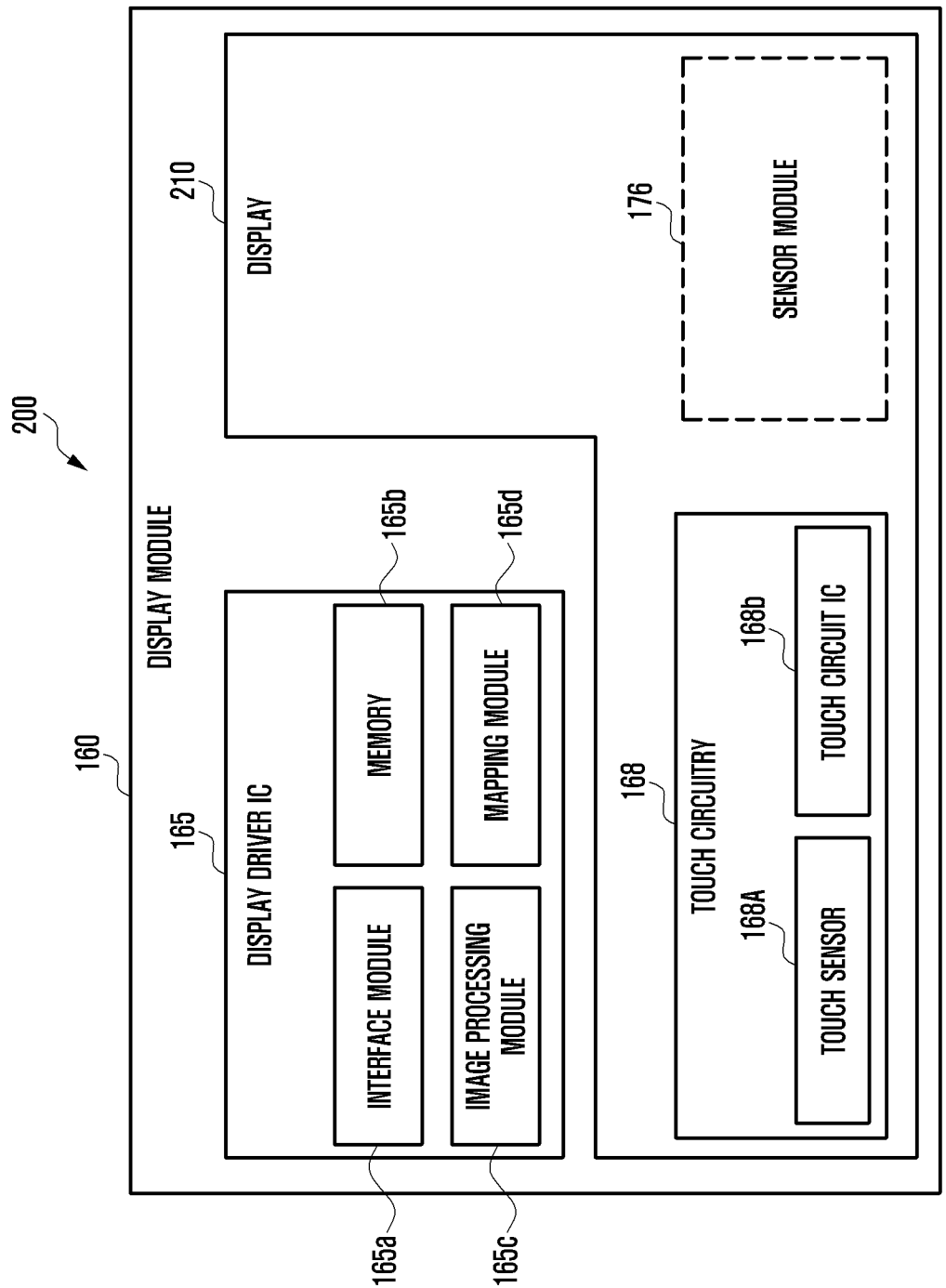
FIG. 2 is a block diagram illustrating a display device according to an embodiment of the disclosure.

FIG. 2 is a block diagram illustrating the display module according to an embodiment of the disclosure.

Referring to FIG. 2, in a diagram 200, the display module 160 may include a display 210 and a display driver integrated circuit (DDIC) 165 to control the display 210. The DDIC 165 may include an interface module 165a, memory 165b (e.g., buffer memory), an image processing module 165c, or a mapping module 165d. The DDIC 165 may receive image information that contains image data or an image control signal corresponding to a command to control the image data from another component of the electronic device 101 via the interface module 165a. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDIC 165 may communicate, for example, with touch circuitry 150 or the sensor module 176 via the interface module 165a. The DDIC 165 may also store at least part of the received image information in the memory 165b, for example, on a frame by frame basis.

The image processing module 165c may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 165d may generate a voltage value or a current value corresponding to the image data pre-processed or post-processed by the image processing module 165c. According to an embodiment, the generating of the voltage value or current value may be performed, for example, based at least in part on one or more attributes of the pixels (e.g., an array, such as a red green blue (RGB) stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 168. The touch circuitry 168 may include a touch sensor 168a and a touch sensor IC 168b to control the touch sensor 168a. The touch sensor IC 168b may control the touch sensor 168a to sense a touch input or a hovering input with respect to a certain position on the display 210. To achieve this, for example, the touch sensor 168a may detect (e.g., measure) a change in a signal (e.g., a voltage, a quantity of light, a resistance, or a quantity of one or more electric charges) corresponding to the certain position on the display 210. The touch circuitry 168 may provide input information (e.g., a position, an area, a pressure, or a time) indicative of the touch input or the hovering input detected via the touch sensor 168*a* to the processor 120. According to an embodiment, at least part (e.g., the touch sensor IC 168*b*) of the touch circuitry 168 may be formed as part of the display 210 or the DDIC 165, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDIC 165, or the input module (touch circuitry) 150)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 168*a* or the sensor module 176 may be disposed between pixels in a pixel layer of the display 210, or over or under the pixel layer.

An electronic device (e.g., an electronic device 101 of FIG. 1) according to various embodiments may include a peripheral device (e.g., a peripheral device 330 of FIG. 3), a display (e.g., a display 210 of FIG. 2), a DDIC (e.g., a DDIC 165 of FIG. 2) DDIC that drives the display 210 and outputs a tearing effect (TE) signal having a designated frequency, and a processor (e.g., a processor 120 of FIG. 1) that controls the peripheral device 330, the display 210, and the DDIC 165 and transmits image data to the DDIC 165 in response to the TE signal. The DDIC 165 may output the TE signal at a first frequency and may receive an interrupt signal from the peripheral device 330 of FIG. 3 while outputting the TE signal at the first frequency, and may output the TE signal at a second frequency in response to the interrupt signal. Here, the second frequency is greater than the first frequency. The DDIC 165 may receive image data updated by the processor 120 based on the TE signal output at the second frequency, and may drive the display 210 to display the received image data.

According to an embodiment, the second frequency may be a maximum frequency at which the DDIC 165 drives the display 210.

According to an embodiment, the DDIC 165 may set an interrupt request enable (IRQ_EN) signal to an enabled state or a disabled state based on a user input or settings of an executed application, may detect whether the interrupt signal is received from the peripheral device 330 when the IRQ_EN signal is in an enabled state, may change the frequency of the TE signal from the first frequency to the second frequency when the interrupt signal is received from the peripheral device 330 in a state in which the IRQ_EN signal is enabled, and may maintain the frequency of the TE signal at the first frequency when the interrupt signal is not received from the peripheral device 330 in a state in which the IRQ_EN signal is enabled.

According to an embodiment, when the interrupt signal is received from the peripheral device 330 in a state in which the IRQ_EN signal is disabled, the DDIC 165 may maintain the frequency of the TE signal at the first frequency regardless of the received interrupt signal.

According to an embodiment, when a time during which the interrupt signal is not input is counted while the TE signal is output at the second frequency and the counted time during which the interrupt signal is not input is greater than or equal to a designated time, the DDIC 165 may change the frequency of the TE signal from the second frequency to the first frequency.

According to an embodiment, the processor 120 may determine the first frequency to be a value lower than the second frequency based on the configuration of the application being executed.

According to an embodiment, the first frequency may be configured to any one frequency selected from among 1 Hz, 10 Hz, 15 Hz, 20 Hz, 24 Hz, 30 Hz, 48 Hz, 60 Hz, 90 Hz, or 96 Hz.

According to an embodiment, the peripheral device 330 may include at least one device selected from among a touch sensor, a fingerprint sensor, an illuminance sensor, or a stylus pen included in the electronic device 101, or a keyboard device connected to the electronic device 101 through near field communication (NFC).

According to an embodiment, the DDIC 165 may include an interrupt pin, and may receive the interrupt signal generated from the peripheral device 330 through the interrupt pin.

A method of the electronic device 101 according to various embodiments may include outputting, by the DDIC 165, a TE signal at a first frequency, receiving, by the DDIC 165, the interrupt signal from the peripheral device 330 of the electronic device 101 while outputting the TE signal at the first frequency, outputting the TE signal at a second frequency in response to the interrupt signal while the second frequency is greater than the first frequency, receiving, by the DDIC 165, image data updated by the processor 120 based on the TE signal output at the second frequency, and driving, by the DDIC 165, the display 210 to display the received image data.

According to an embodiment, the second frequency may be a maximum frequency at which the DDIC 165 drives the display 210.

According to an embodiment, the method may further include configuring, by the DDIC 165, an IRQ_EN signal to be in an enabled state or a disabled state based on a user input or a configuration of an application executed by the electronic device 101, detecting, by the DDIC 165, whether the interrupt signal is received from the peripheral device 330 when the IRQ_EN signal is in the enabled state, changing, by the DDIC 165, the frequency of the TE signal from the first frequency to the second frequency when the interrupt signal is received from the peripheral device 330 in a state in which the IRQ_EN signal is enabled, and maintaining, by the DDIC 165, the frequency of the TE signal at the first frequency when the interrupt signal is not received from the peripheral device 330 in the state in which the IRQ_EN signal is enabled.

According to an embodiment, the method may further include maintaining, by the DDIC 165, the frequency of the TE signal at the first frequency regardless of the received interrupt signal, when the interrupt signal is received from the peripheral device 330 in a state in which the IRQ_EN signal is disabled.

According to an embodiment, the method may further include counting, by the DDIC 165, a time during which the interrupt signal is not input while outputting the TE signal at the second frequency, and changing, by the DDIC 165, the frequency of the TE signal from the second frequency to the first frequency when the time during which the interrupt signal is not input is greater than or equal to a designated time.

According to an embodiment, the method may further include determining, by the processor 120, the first frequency to be a value lower than the second frequency based on the settings of the executed application.

According to an embodiment, the first frequency may be configured to any one frequency selected from among 1 Hz, 10 Hz, 15 Hz, 20 Hz, 24 Hz, 30 Hz, 48 Hz, 60 Hz, 90 Hz, and 96 Hz.

According to an embodiment, the peripheral device 330 may include at least one selected from among a touch sensor, a fingerprint sensor, an illuminance sensor, or a stylus pen included in the electronic device 101, or a keyboard device connected to the electronic device 101 through NFC.

According to an embodiment, the DDIC 165 may include an interrupt pin, and the DDIC 165 may receive the interrupt signal generated from the peripheral device 330 through the interrupt pin.

The electronic device 101 according to various embodiments may include a display 210 configured to include a touch sensor, a display driver integrated circuit (DDIC) 165 configured to drive the display 210 and to output a tearing effect (TE) signal having a designated frequency, and a processor 120 configured to control the display 210 and the DDIC 165 and to transmit image data to the DDIC 165 in response to the TE signal. When detecting a user's touch input or a hovering input to the display 210, the touch sensor may transmit an interrupt signal to the DDIC 165, and the DDIC 165 may output the TE signal at a first frequency, may receive the interrupt signal from the touch sensor while outputting the TE signal at the first frequency, may output the TE signal at a second frequency in response to the interruption signal while the second frequency is greater than the first frequency, may receive image data updated by the processor 120 based on the TE signal output at the second frequency, and may drive the display 210 to display the received image data.

According to an embodiment, the second frequency may be a maximum frequency at which the DDIC 165 drives the display 210.

Figure 3:
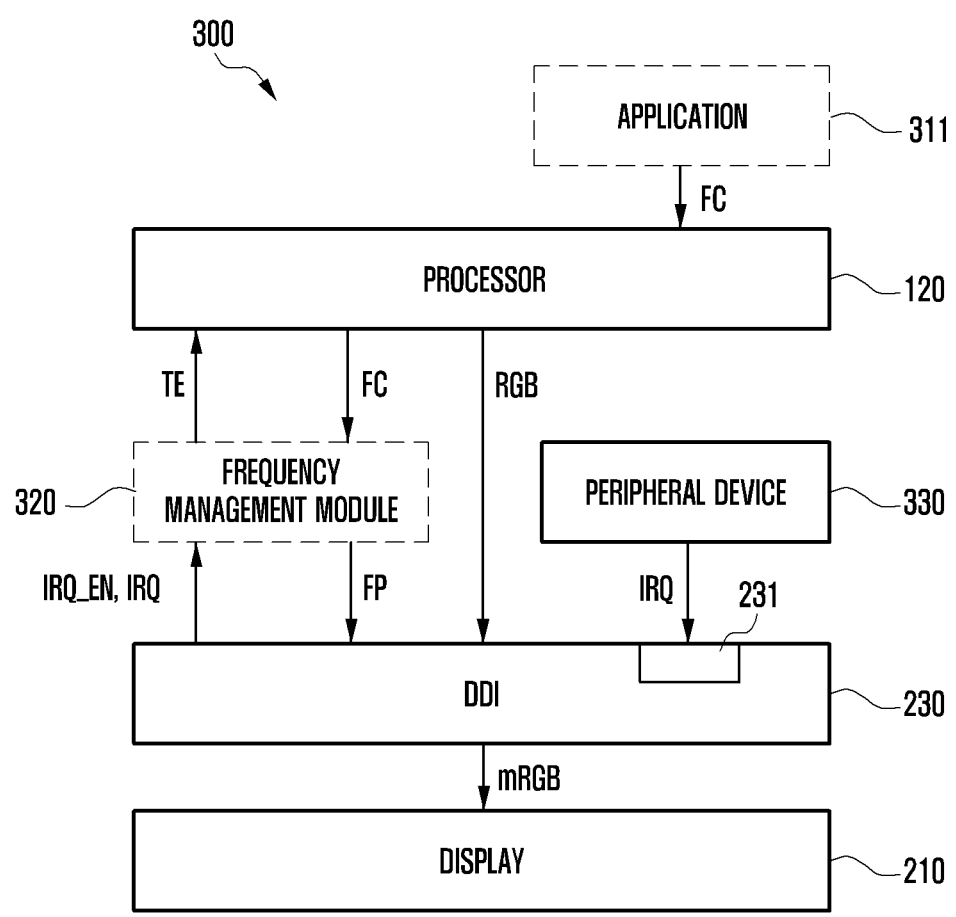
FIG. 3 is a block diagram illustrating an electronic device according to an embodiment of the disclosure.

FIG. 3 is a block diagram illustrating an electronic device according to an embodiment of the disclosure.

Referring to FIG. 3, an electronic device 300 (e.g., the electronic device 101 of FIG. 1) may include a processor 120 (e.g., the processor 120 of FIG. 1), a DDIC 230 (e.g., the DDIC 165 of FIG. 2), or a display 210 (e.g., the display 210 of FIG. 2).

According to an embodiment, the electronic device 101 may operate based on a command mode that is a display standard defined in a mobile industry processor interface (MIPI). For example, the processor 120 of the electronic device 101 may perform the role of a host defined in the MIPI. For example, the DDIC 230 may output a TE signal at a specific frequency, and the processor 120 may transmit image data RGB to the DDIC 230 in response to the TE signal output from the DDIC 230. The DDIC 230 may convert the image data RGB received from the processor 120 according to a characteristic (e.g., resolution) of the display 210, and may transmit the converted image data RGB to the display 210.

According to an embodiment, the processor 120 may transmit the image data RGB to the DDIC 230 based on the TE signal output from the DDIC 230. For example, a driving frequency (e.g., a refresh rate) at which the electronic device 101 drives the display 210 may be determined based on the frequency of the TE signal output from the DDIC 230. The term "TE signal" used in the disclosure may refer to a tearing effect (TE) signal defined in the MIPI standard.

According to an embodiment, the processor 120 may execute an application 311 and may control the frequency of the TE signal output from the DDIC 230 according to a configuration of the executed application 311. The processor 120 may acquire information related to a frequency at which the DDIC 230 currently drives the display 210 through a frequency management module 320. The processor 120 may transmit the acquired frequency information of the display 210 to the application 311. The application 311 may generate a frequency control signal FC to lower a driving frequency of the display 210 in consideration of the visibility of the display 210 according to power consumption of the electronic device 101, a luminance deviation of the display 210, a color deviation of the display 210, or an external environment (e.g., illuminance) of the electronic device 101.

According to an embodiment, the processor 120 may transmit the frequency control signal FC generated by the application 311 to the frequency management module 320. The frequency management module 320 may determine a frequency parameter FP corresponding to the frequency control signal FC among a plurality of frequency parameters FPs based on the frequency control signal FC received from the processor 120. For example, the plurality of frequency parameters FPs may include designated frequencies. For example, the plurality of frequency parameters FPs may include 1 Hz, 10 Hz, 15 Hz, 20 Hz, 24 Hz, 30 Hz, 48 Hz, 60 Hz, 90 Hz, or 96 Hz and these are only examples and may not be limited. The DDIC 230 may change the frequency of the TE signal to a value lower than a maximum frequency (e.g., 120 Hz) for driving the display 210 based on the frequency parameter FP corresponding to the frequency control signal FC among the plurality of frequency parameters FPs. For example, the frequency control signal FC may include a control signal for lowering the frequency of the TE signal from 120 Hz to 30 Hz, and the DDIC 230 may change the frequency of the TE signal from 120 Hz to 30 Hz according to the frequency control signal. Accordingly, the DDIC 230 may reduce the power consumption by driving the display 210 at 30 Hz. In the above, 30 Hz is only an example, and any frequency may be used as long as the frequency is lower than the maximum frequency (e.g., 120 Hz).

According to various embodiments, the frequency management module 320 may be included in the DDIC 230. For example, in the example of FIG. 3, the frequency management module 320 and the DDIC 230 are separately indicated, but this is for convenience of description, and operations performed by the frequency management module 320 may be performed inside the DDIC 230.

According to an embodiment, the DDIC 230 may receive an interrupt signal interrupt request (IRQ) from the peripheral device 330. The peripheral device 330 may include at least one device selected from among a touch sensor (e.g., the touch sensor 168a of FIG. 2), a fingerprint sensor (e.g., the fingerprint sensor 440 of FIG. 4), an illuminance sensor (not shown), or a stylus pen 410 included in the electronic device 101, or a keyboard device (e.g., a keyboard device 501 of FIG. 5) connected to the electronic device 101 through NFC. The DDIC 230 may include an interrupt pin 231. The DDIC 230 may receive the interrupt signal IRQ generated from the peripheral device 330 through the interrupt pin 231.

According to an embodiment, the peripheral device 330 may include the touch sensor 168*a*. The touch sensor 168*a* may transmit the interrupt signal IRQ to the DDIC 230 based on detecting a user's touch input or a hovering input to the display 210.

Figure 4:
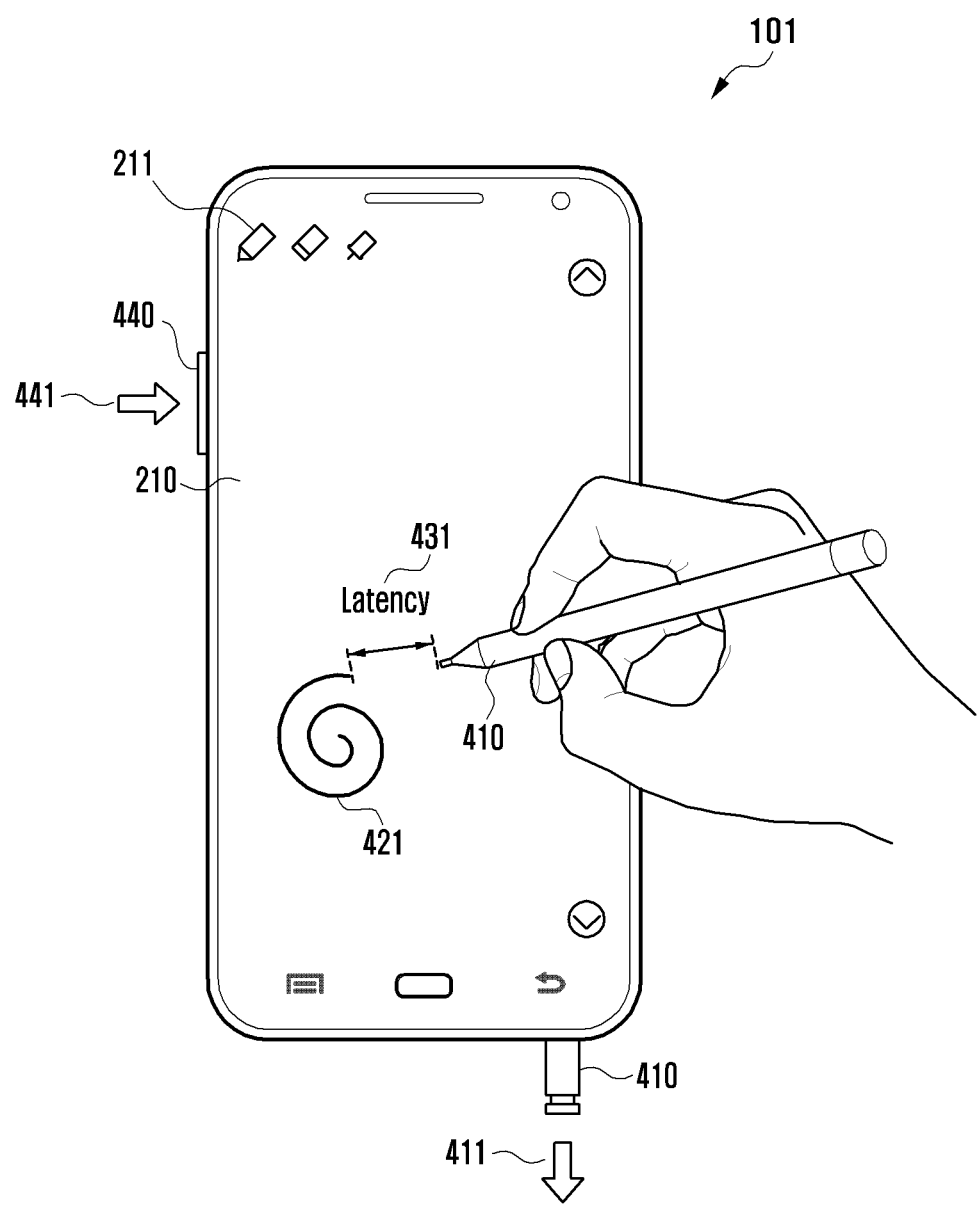
FIG. 4 is a plan view illustrating an electronic device for explaining an interrupt signal according to an embodiment of the disclosure.

According to an embodiment, the peripheral device 330 may include a fingerprint sensor (e.g., the fingerprint sensor 440 of FIG. 4). For example, the fingerprint sensor 440 may be disposed on a physical button exposed to the outside through at least a portion of the housing of the electronic device 101. The fingerprint sensor 440 may transmit the interrupt signal IRQ to the DDIC 230 based on detecting user's fingerprint information.

According to an embodiment, the peripheral device 330 may include a stylus pen (e.g., the stylus pen 410 of FIG. 4). For example, when detecting an event (e.g., an event 411 of FIG. 4) in which the stylus pen 410 is detached from the electronic device 101, the electronic device 101 may transmit the interrupt signal IRQ to the DDIC 230.

According to an embodiment, the peripheral device 330 may include a keyboard device (e.g., a keyboard device 501 of FIG. 5) that is physically coupled to the electronic device 101 or can be connected to the electronic device 101 through NFC. For example, when detecting an event in which the electronic device 101 is connected to the keyboard device 501 through a physical connector such as a pogo pin (not shown) or is wirelessly connected to the keyboard device through NFC, the electronic device 101 may transmit the interrupt signal IRQ to the DDIC 230.

According to an embodiment, the DDIC 230 may increase a frequency at which the display 210 is currently driven to the maximum frequency in response to receiving the interrupt signal IRQ from the peripheral device 330. For example, the DDIC 230 may receive the interrupt signal IRQ from the peripheral device 330 while outputting the TE signal at the first frequency. The DDIC 230 may change the frequency of the TE signal from the first frequency to the second frequency in response to the interrupt signal IRQ. According to an embodiment, the second frequency may be the maximum frequency at which the DDIC 230 drives the display 210. For example, the second frequency may be 120 Hz or 240 Hz.

According to an embodiment, the DDIC 230 may determine whether to perform a frequency conversion operation based on a user input or the settings of the executed application 311. The DDIC 230 may set an IRQ_EN signal IRQ_EN to an enabled state or a disabled state based on the user input or the settings of the executed application 311. The DDIC 230 may determine whether to perform the frequency conversion operation according to whether the IRQ_EN signal is in the enabled state or the disabled state. The frequency conversion operation may refer to an operation in which the DDIC 230 changes the frequency at which the display 210 is currently driven from the first frequency to the second frequency in response to the interrupt signal IRQ.

According to an embodiment, when the IRQ_EN signal is in the enabled state, the DDIC 230 may detect whether the interrupt signal IRQ is received from the peripheral device 330.

According to an embodiment, when the interrupt signal IRQ is received from the peripheral device 330 while the IRQ_EN signal is enabled, the DDIC 230 may convert the frequency of the TE signal from the first frequency to the second frequency.

According to an embodiment, when the interrupt signal IRQ is not received from the peripheral device 330 while the IRQ_EN signal is enabled, the DDIC 230 may maintain the frequency of the TE signal at the first frequency.

According to an embodiment, when the interrupt signal IRQ is received from the peripheral device 330 while the IRQ_EN signal is disabled, the DDIC 230 may maintain the frequency of the TE signal at the first frequency regardless of the received interrupt signal.

According to various embodiments, the DDIC 230 may transmit the IRQ_EN signal and the received interrupt signal IRQ to the frequency management module 320. The frequency management module 320 may maintain the frequency of the TE signal in the current state or may vary the frequency of the TE signal based on the state of the IRQ_EN signal and whether the interrupt signal IRQ is received.

According to various embodiments, the DDIC 230 may count a time during which the interrupt signal IRQ is not input while the TE signal is output at the second frequency (i.e., the maximum frequency). According to an embodiment, the DDIC 230 may change the frequency of the TE signal from the second frequency to the first frequency when the time during which the interrupt signal IRQ is not input is greater than a designated time. For example, when no more touch input is detected until the designated time elapses while the TE signal is output at the second frequency (i.e., the maximum frequency), the DDIC 230 may lower the frequency of the TE signal from the second frequency to the first frequency. For example, the DDIC 230 may receive a frequency control signal FC based on the settings of the executed application 311 from the processor 120, and may configure the first frequency based on the received frequency control signal FC.

FIG. 4 is a plan view illustrating an electronic device for explaining an interrupt signal IRQ according to an embodiment of the disclosure.

Referring to FIG. 4, the electronic device 101 according to various embodiments may include a touch sensor (e.g., the touch sensor 168*a* of FIG. 2) of the display 210, a stylus pen 410, or a fingerprint sensor 440 as a peripheral device (e.g., the peripheral device 330 of FIG. 3).

According to an embodiment, the peripheral device 330 may include a touch sensor 168*a*. The touch sensor 168*a* may transmit an interrupt signal IRQ to the DDIC 230 based on detecting a user's touch input 421 (or a hovering input) to the display 210. The DDIC 230 may change the frequency of a TE signal to a second frequency that is the maximum frequency in response to the user's touch input 421 (or the hovering input) through the touch sensor 168*a*. Accordingly, an input delay 431 of a user interface (e.g., a drawing interface) displayed by the electronic device 101 according to the touch input may be reduced.

According to an embodiment, the peripheral device 330 may include the fingerprint sensor 440. For example, the fingerprint sensor 440 may be disposed on a physical button exposed to the outside through at least a portion of the housing of the electronic device 101. The fingerprint sensor 440 may transmit the interrupt signal IRQ to the DDIC 230 based on detecting user's fingerprint information. For example, when detecting an event 441 of pressing a physical button including the fingerprint sensor 440, the electronic device 101 may transmit the interrupt signal IRQ to the DDIC 230. The DDIC 230 may change the frequency of the TE signal to the second frequency, which is the maximum frequency, in response to the interrupt signal IRQ output from the fingerprint sensor 440. Accordingly, after the electronic device 101 acquires the fingerprint information through the fingerprint sensor 440, a period for updating the screen of the display 210 may be configured to be fast.

According to an embodiment, the peripheral device 330 may include the stylus pen 410. For example, when detecting an event 411 in which the stylus pen 410 is detached from the electronic device 101, the electronic device 101 may transmit an interrupt signal IRQ to the DDIC 230. The DDIC 230 may receive the interrupt signal IRQ according to the detachment of the stylus pen 410, and may change the frequency of the TE signal to a second frequency that is the maximum frequency in response to the received interrupt signal IRQ. Accordingly, while the electronic device 101 uses the stylus pen 410, the period for updating the screen of the display 210 may be configured to be fast.

Figure 5:
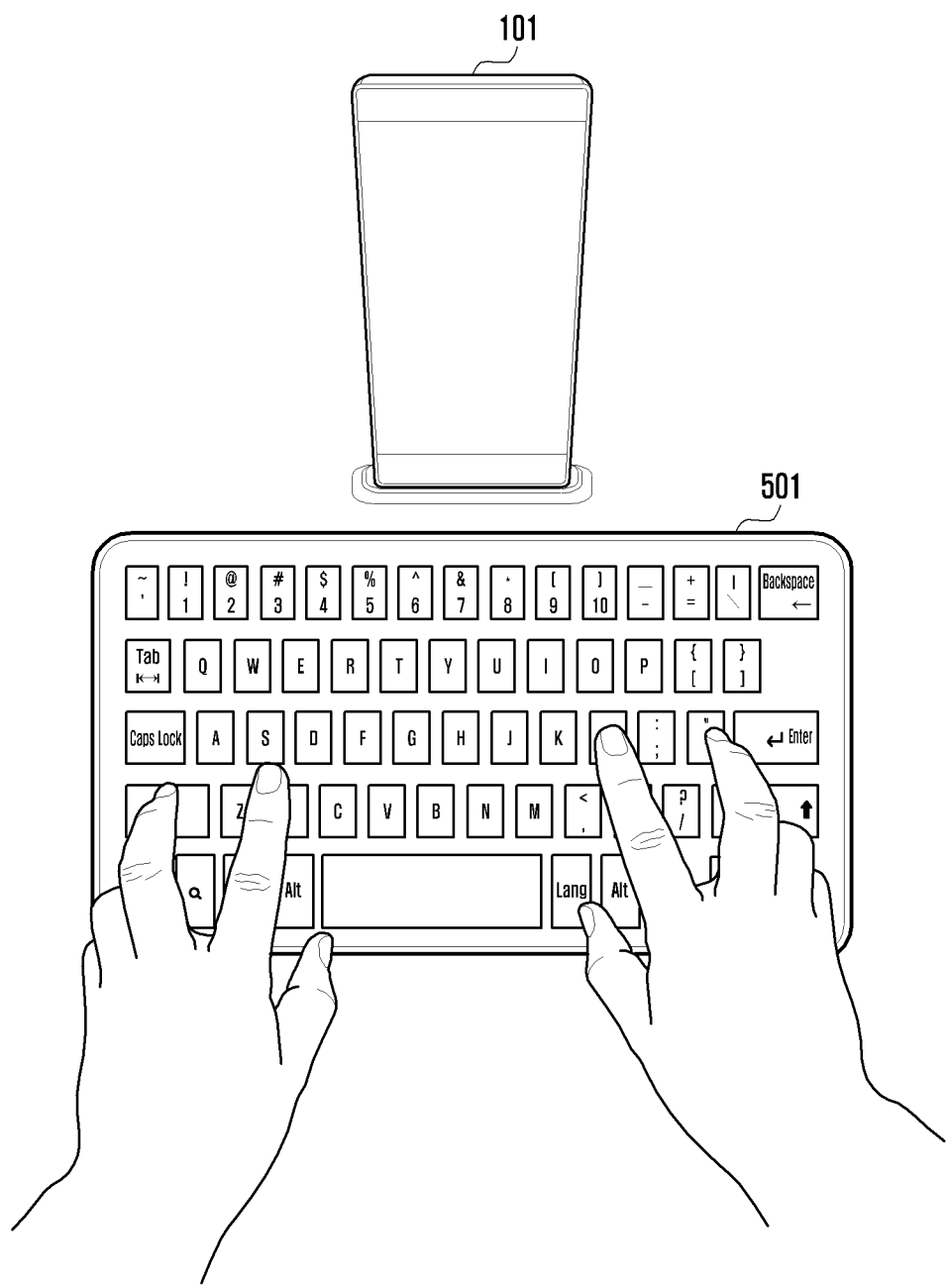
FIG. 5 is a conceptual diagram for explaining an interrupt signal according to an embodiment of the disclosure.

FIG. 5 is a conceptual diagram for explaining an interrupt signal IRQ according to an embodiment of the disclosure.

Referring to FIG. 5, the peripheral device 330 according to another embodiment may include a keyboard device 501 that may be physically coupled to the electronic device 101 or connected to the electronic device 101 through NFC. For example, when detecting an event in which the electronic device 101 is connected to the keyboard device 501 through a physical connector such as a pogo pin (not shown) or is wirelessly connected to the keyboard device 501 through NFC (e.g., Bluetooth communication), the electronic device 101 may transmit an interrupt signal IRQ to the DDIC 230. The DDIC 230 may receive the interrupt signal IRQ according to the connection between the keyboard device 501 and the electronic device 101, and may configure the frequency of the TE signal to a second frequency that is the maximum frequency in response to the received interrupt signal IRQ. Accordingly, while the electronic device 101 is connected to the keyboard device 501, a period for updating the screen of the display 210 may be configured to be fast.

Figure 6:
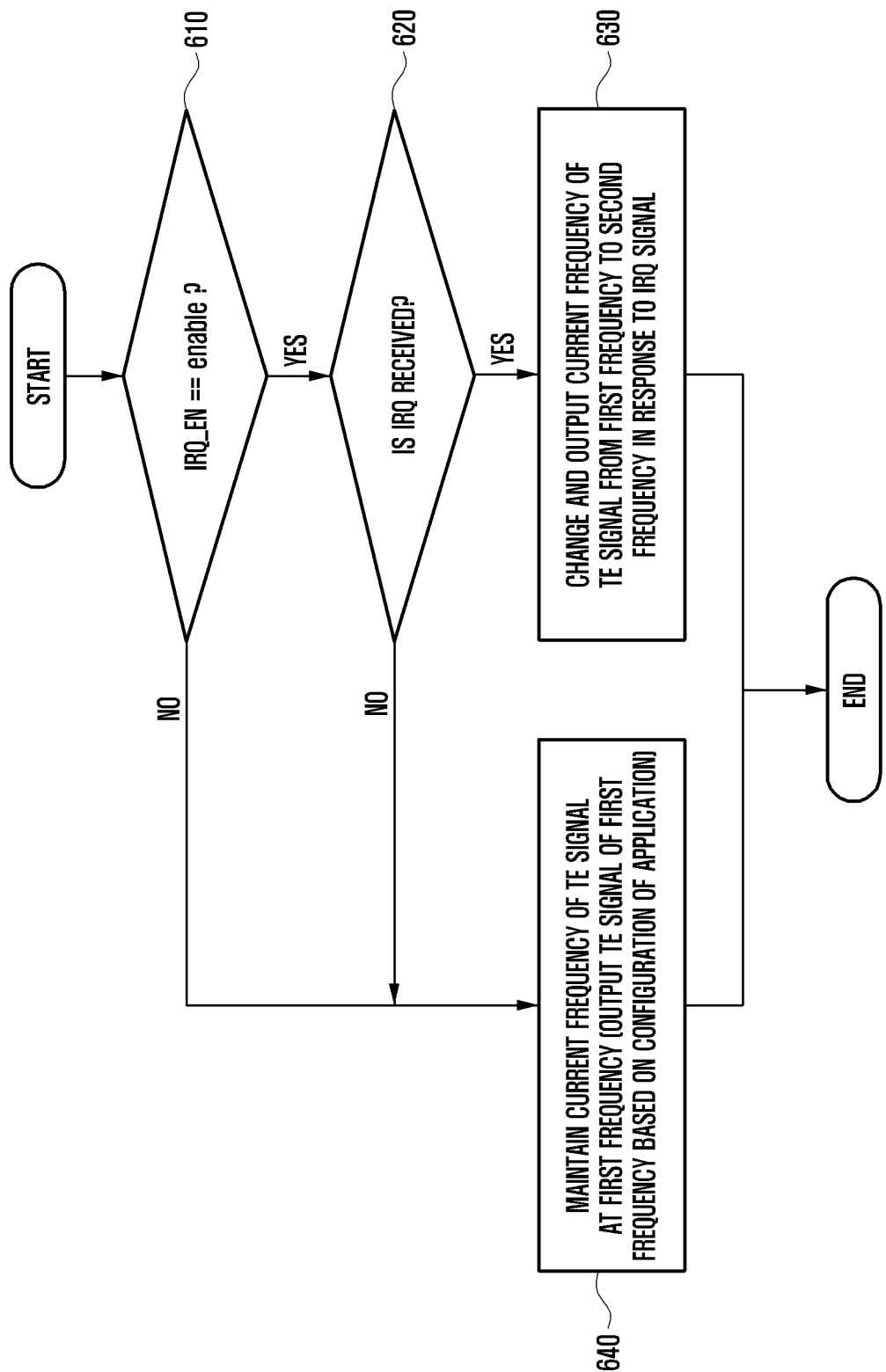
FIG. 6 is a flowchart illustrating an operation in which a DDIC determines whether a frequency is variable according to an IRQ_EN signal according to an embodiment of the disclosure.

FIG. 6 is a flowchart illustrating an operation in which the DDIC 230 determines whether a frequency is variable according to an IRQ_EN signal according to an embodiment of the disclosure.

Referring to FIG. 6, operations may be performed by a processor (e.g., the processor 120 of FIG. 1). For example, a memory (e.g., the memory 130 of FIG. 1) of the electronic device 101 may store, when executed, instructions that control the DDIC 230 so that the processor 120 performs some of the operations illustrated in FIG. 6.

Hereinafter, the operation of the DDIC 230 according to an embodiment will be described with reference to FIG. 6.

In operation 610, the DDIC 230 according to an embodiment may identify whether an IRQ_EN signal is in an enabled state. The IRQ_EN signal may be configured to be in an enabled state or a disabled state based on a user input or a configuration of an application 311 being executed.

According to an embodiment, the DDIC 230 may perform operation 620 when the IRQ_EN signal is in the enabled state (e.g., when the result of operation 610 is "Yes").

According to an embodiment, the DDIC 230 may perform operation 640 when the IRQ_EN signal is not in the enabled state (e.g., in the disabled state, when the result of operation 610 is "No").

In operation 620, when the IRQ_EN signal is in the enabled state, the DDIC 230 according to an embodiment may detect whether an interrupt signal IRQ is received from the peripheral device 330. For example, when the IRQ_EN signal is in the enabled state, the DDIC 230 may detect whether the interrupt signal IRQ is received from at least one of the touch sensor 168a, the fingerprint sensor 440, the illuminance sensor, or the stylus pen 410 included in the electronic device 101, or a keyboard device 501 that is connected to the electronic device 101 through NFC.

According to an embodiment, the DDIC 230 may perform operation 630 when the interrupt signal IRQ is received (e.g., when the result of operation 620 is "Yes").

According to an embodiment, the DDIC 230 may perform operation 640 when the interrupt signal IRQ is not received (e.g., when the result of operation 620 is "No").

In operation 630, the DDIC 230 according to an embodiment may change the frequency of a TE signal TE from a first frequency to a second frequency in response to the interrupt signal IRQ. According to an embodiment, the second frequency may be the maximum frequency at which the DDIC 230 drives the display 210. For example, the second frequency may be 120 Hz or 240 Hz. As the TE signal is output at the maximum frequency driving the display 210, the DDIC 230 may receive updated image data RGB more quickly from the processor 120, and thus the display 210 can be quickly updated.

In operation 640, the DDIC 230 according to an embodiment may maintain the current frequency of the TE signal as the first frequency. For example, the DDIC 230 may output the TE signal of the first frequency based on the configuration of the application 311. The DDIC 230 may reduce power consumption of the display 210 by outputting the TE signal at the first frequency lower than the maximum frequency for driving the display 210.

Figure 7:
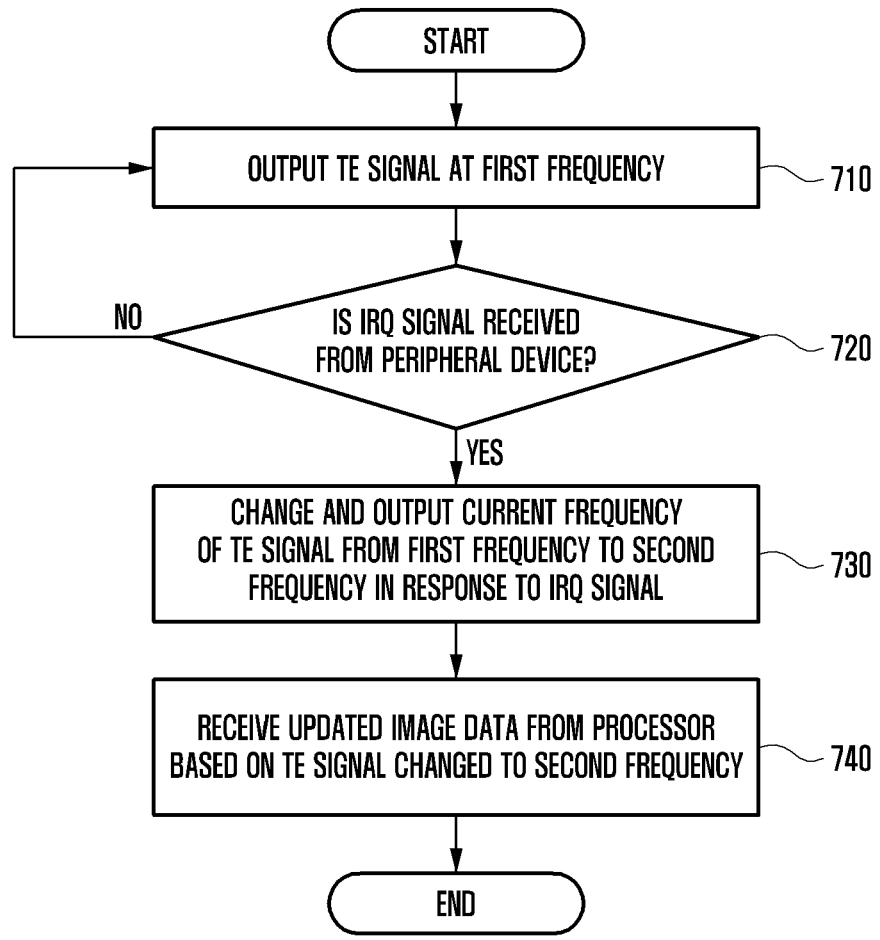
FIG. 7 is a flowchart illustrating an operation of a DDIC according to an embodiment of the disclosure.

FIG. 7 is a flowchart illustrating an operation of a DDIC according to an embodiment of the disclosure.

Referring to FIG. 7, operations may be performed by a processor (e.g., the processor 120 of FIG. 1). For example, a memory (e.g., the memory 130 of FIG. 1) of the electronic device 101 may store, when executed, instructions that control the DDIC 230 so that the processor 120 performs some of the operations illustrated in FIG. 7.

Hereinafter, the operation of the DDIC 230 according to an embodiment will be described with reference to FIG. 7.

In operation 710, the DDIC 230 according to an embodiment may output a TE signal at a first frequency. The DDIC 230 may receive a frequency control signal based on settings of an executed application 311 from the processor 120 and may configure the first frequency based on the received frequency control signal. For example, the first frequency may be 1 Hz, 10 Hz, 15 Hz, 20 Hz, 24 Hz, 30 Hz, 48 Hz, 60 Hz, 90 Hz, or 96 Hz which is lower than the maximum frequency at which the DDIC 230 drives display 210, but these are only examples and may not be limited.

In operation 720, the DDIC 230 according to an embodiment may determine whether to receive the interrupt signal IRQ from the peripheral device 330. For example, operation 720 may be at least partially similar to or identical to operation 620 of FIG. 6.

According to an embodiment, the DDIC 230 may perform operation 720 when the interrupt signal IRQ is received (e.g., when the result of operation 720 is "Yes").

According to an embodiment, the DDIC 230 may perform operation 710 again when the interrupt signal IRQ is not received (e.g., when the result of operation 720 is "No").

In operation 730, the DDIC 230 according to an embodiment may change the frequency of the TE signal from the first frequency to the second frequency in response to the interrupt signal IRQ. For example, operation 730 may be at least partially similar to or identical to operation 630 of FIG. 6.

In operation 740, the DDIC 230 according to an embodiment may receive updated image data RGB from the processor 120 based on the TE signal changed to the second frequency. For example, when the DDIC 230 outputs the TE signal at the second frequency, the processor 120 may transmit the updated image data RGB to the DDIC 230 every period corresponding to the second frequency. According to an embodiment, as the TE signal is output at the maximum frequency driving the display 210, the DDIC 230 may receive the updated image data RGB more rapidly from the processor 120, and thus the screen of the display 210 may be updated quickly.

Figure 8:
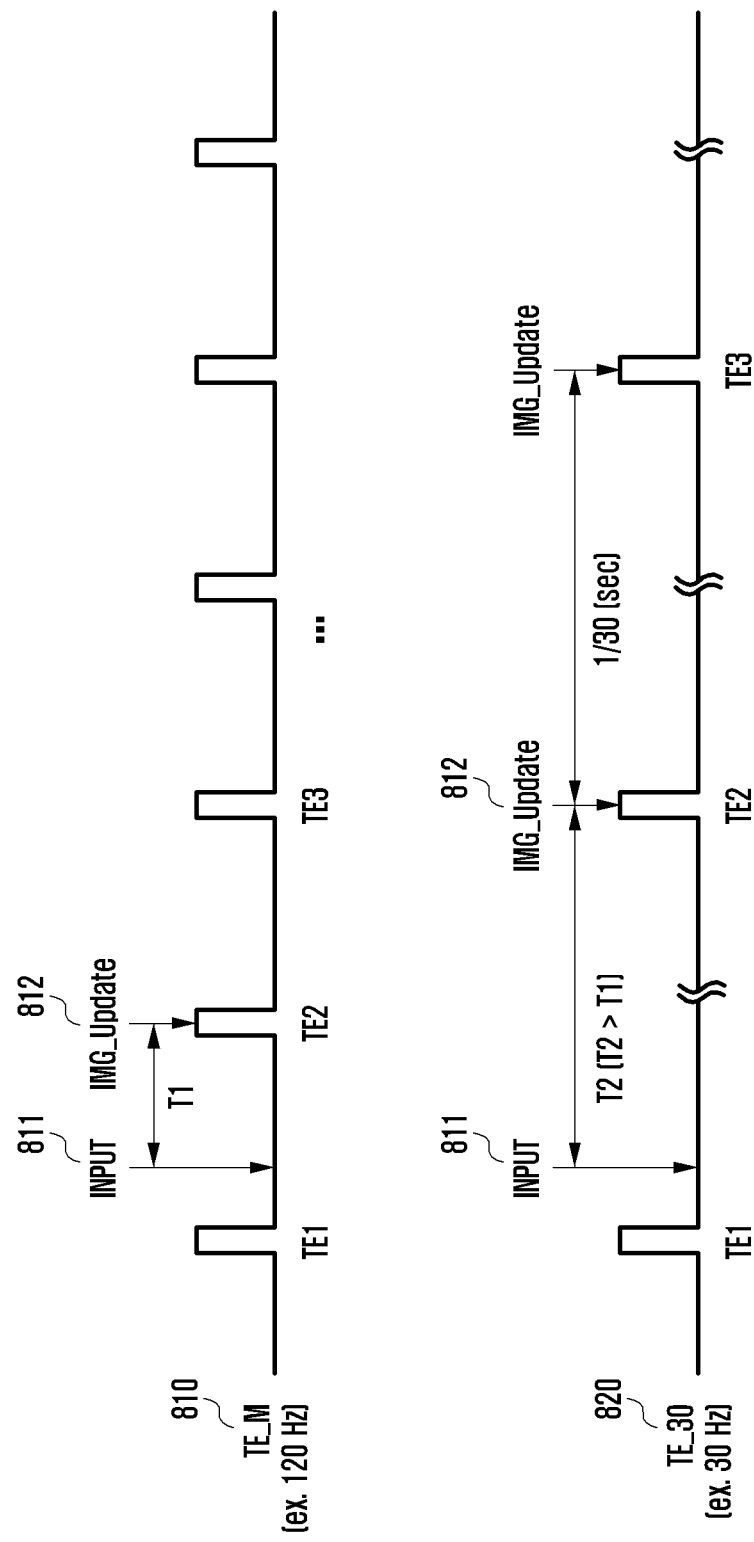
FIG. 8 is an example for explaining a time for an electronic device to update a screen when an input from a peripheral device occurs, according to an embodiment of the disclosure.

FIG. 8 is an example for explaining a time for an electronic device to update a screen when an input from a peripheral device occurs, according to an embodiment of the disclosure.

Referring to FIG. 8, a signal 810 represents a TE signal TE outputted by the DDIC 230 according to the comparative example at a second frequency that is the maximum frequency for driving the display 210. According to the illustrated example, the second frequency may be 120 Hz.

Referring to the signal 810, the electronic device 101 may receive an input from the peripheral device 330 while the DDIC 230 outputs a TE signal TEM at the second frequency. For example, in a time between a time point when the DDIC 230 outputs a first TE signal TE1 and a time point when the DDIC 230 outputs a second TE signal TE2, the electronic device 101 may receive a touch input 811. The processor 120 may update image data RGB according to the touch input, and may output the updated image data RGB when the DDIC 230 outputs the second TE signal TE2. Accordingly, a time required from a time point of the touch input 811 when the electronic device 101 receives an input (e.g., a touch input) from the peripheral device 330 to a time point 812 when the processor 120 transmits the updated image data RGB to the DDIC 230 according to the input of the peripheral device 330 may be T1.

Referring to FIG. 8, a signal 820 represents a TE signal TE_30 output by the DDIC 230 according to the comparative example at the first frequency lower than the maximum frequency based on the configuration of the application 311. According to the illustrated example, the first frequency may be 30 Hz.

Referring to FIG. 8, the signal 820, the electronic device 101 may receive an input from the peripheral device 330 while the DDIC 230 outputs the TE signal TE_30 at the first frequency. For example, in a time between a time point when the DDIC 230 outputs the first TE signal TE1 and a time point when the DDIC 230 outputs the second TE signal TE2, the electronic device 101 may receive a touch input. The processor 120 may update the image data RGB according to the touch input, and may output the updated image data RGB when the DDIC 230 outputs the second TE signal TE2. Accordingly, a time required from a time point 821 when the electronic device 101 receives an input (e.g., a touch input) from the peripheral device 330 to a time point 822 when the processor 120 transmits the updated image data RGB to the DDIC 230 according to the input from the peripheral device 330 may be T2.

According to the comparative example, if the time point of the touch input 811 when the input from the peripheral device 330 occurs when the DDIC 230 outputs the TE signal TE_M at the second frequency is the same as the time point 821 when the input from the peripheral device 330 occurs when the DDIC 230 outputs the TE signal TE_30 at the first frequency, the required time T2 may be longer than the required time T1. For example, assuming that the second frequency is 120 Hz, the required time T1 may be less than or equal to $1/120$ (sec). On the other hand, assuming that the first frequency is 30 Hz, the required time T2 may be less than or equal to $1/30$ (sec).

Accordingly, in the electronic device 101 according to the comparative example, when the DDIC 230 outputs the TE signal TE_30 at the first frequency, the update rate of the screen according to the input from the peripheral device 330 may be slow and a delay may occur.

Figure 9:
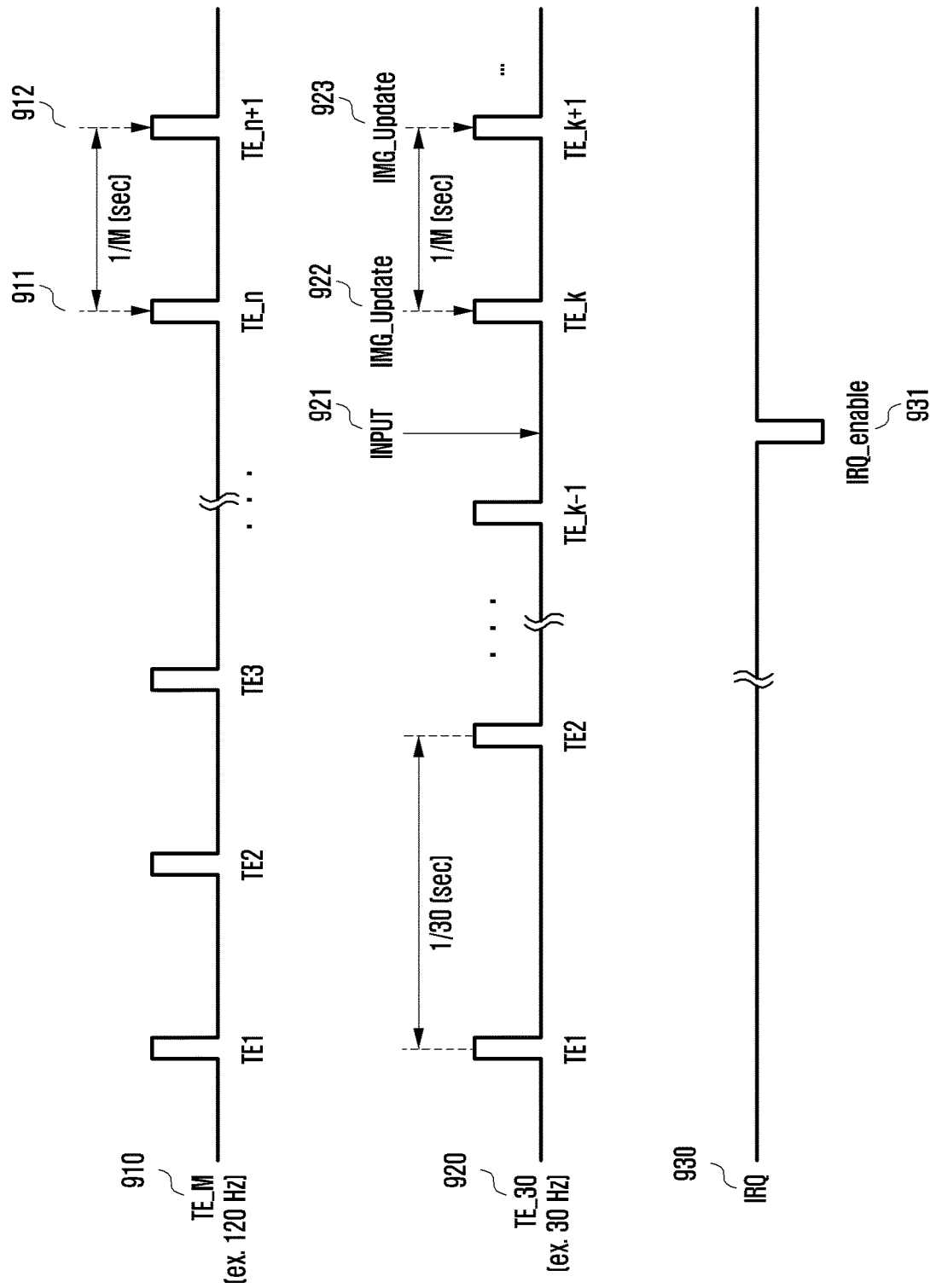
FIG. 9 is an example for explaining a time for an electronic device to update a screen when an input from a peripheral device occurs, according to an embodiment of the disclosure.

FIG. 9 is an example for explaining a time for the electronic device 101 to update a screen when an input from a peripheral device 330 occurs, according to an embodiment of the disclosure.

Referring to FIG. 9, a signal 910 represents a TE signal TE_M output by the DDIC 230 according to various embodiments at a second frequency that is the maximum frequency for driving the display 210. According to the illustrated example, the second frequency may be 120 Hz.

Referring to FIG. 9, a signal 920 represents a TE signal TE_30 output by the DDIC 230 according to various embodiments at a first frequency lower than the maximum frequency based on the configuration of the application 311. According to the illustrated example, the first frequency may be 30 Hz.

Referring to FIG. 9, a signal 930 may indicate timing of an interrupt signal IRQ according to an input from the peripheral device 330.

Referring to FIG. 9, the signal 910, the electronic device 101 may control the DDIC 230 to output the TE signal TE_M at the second frequency. For example, a time between a time point 911 when the DDIC 230 outputs an n-th TE signal TE_n and a time point 912 when the DDIC 230 outputs an (n+1)-th TE signal TE_n+1 is $1/M$ (sec), for example, $1/120$ (sec).

Referring to FIG. 9, the signal 920, the electronic device 101 may receive an input from the peripheral device 330 while the DDIC 230 outputs the TE signal TE_30 at the first frequency. For example, in a time between a time point when the DDIC 230 outputs a (k−1)-th TE signal TE_k−1 and a time point when the DDIC 230 outputs a k-th TE signal TE_k, the electronic device 101 may receive a touch input. The touch input may become the interrupt signal IRQ and may be transmitted to the DDIC 230. For example, the DDIC 230 may receive the interrupt signal IRQ in an enabled state 931.

As described with reference to operations 720 to 730 of FIG. 7, the DDIC 230 according to various embodiments may change and output the frequency of the TE signal TE from the first frequency to the second frequency. For example, the DDIC 230 may change the frequency of the DDIC 230 to a maximum frequency of 120 Hz in response to the interrupt signal IRQ according to the touch input. Accordingly, the DDIC 230 may output the TE signals TE_k and TE_k+1 of the second frequency after the (k−1)-th TE signal TE_k−1. For example, a time between a time point 922 when the DDIC 230 outputs the k-th TE signal TE_k and a time point 923 when the DDIC 230 outputs the (k+1)-th TE signal TE_k+1 may be $1/M$ (sec), for example, $1/120$ (sec). The processor 120 may update the image data RGB according to the touch input, and may output the updated image data at the time point when the DDIC 230 outputs the k-th TE signal TE_k of the second frequency. Accordingly, a time required from a time point 921 when the electronic device 101 receives an input (e.g., a touch input) from the peripheral device 330 to a time point 922 when the processor 120 transmits the updated image data RGB according to the input from the peripheral device 330 may be less than or equal to a time $1/120$ (sec), which is a time between the k-th TE signal TE_k and the (k+1)-th TE signal TE_k+1, assuming that the second frequency is 120 Hz.

Accordingly, the electronic device 101 according to various embodiments may update the screen quickly even if the input from the peripheral device 330 occurs while the DDIC 230 outputs the TE signal at the first frequency.

Figure 10:
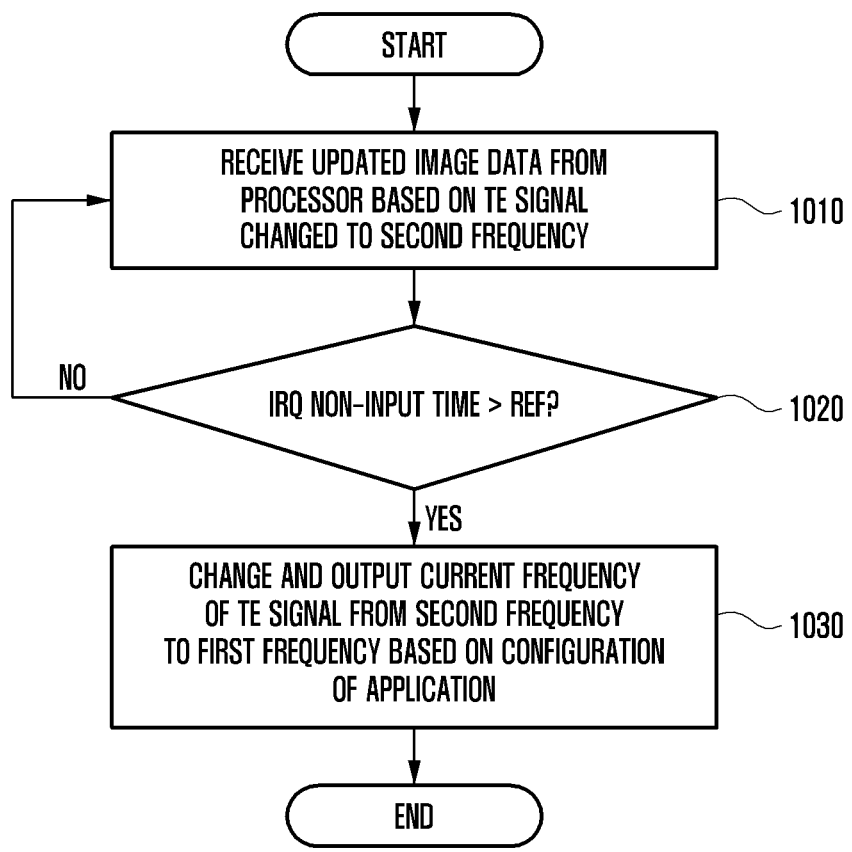
FIG. 10 is a flowchart illustrating an operation in which a DDIC restores a frequency of a TE signal from a second frequency to a first frequency according to an embodiment of the disclosure.

FIG. 10 is a flowchart illustrating an operation in which the DDIC 230 restores a frequency of a TE signal from a second frequency to a first frequency according to an embodiment of the disclosure.

Referring to FIG. 10, operations may be performed by a processor (e.g., the processor 120 of FIG. 1). For example, a memory (e.g., the memory 130 of FIG. 1) of the electronic device 101 may store, when executed, instructions that control the DDIC 230 so that the processor 120 performs some of the operations illustrated in FIG. 10.

Referring to FIG. 10, the operations may be operations performed by the DDIC 230 after operation 740 illustrated in FIG. 7.

In operation 1010, the DDIC 230 according to an embodiment may receive updated image data RGB from the processor 120 based on a TE signal changed to a second frequency. For example, when the DDIC 230 outputs the TE signal at the second frequency, the processor 120 may transmit the updated image data RGB to the DDIC 230 every period corresponding to the second frequency. According to an embodiment, operation 1010 may be at least partially similar to or identical to operation 740 illustrated in FIG. 7. The DDIC 230 according to an embodiment may identify whether an IRQ_EN signal is in an enabled state while the frequency of the TE signal is configured to the second frequency in response to the interrupt signal IRQ. The DDIC 230 according to an embodiment may maintain the operation of configuring the frequency of the TE signal TE to the second frequency in response to the interrupt signal IRQ when an IRQ_EN signal is in an enabled state. Even when the interrupt signal IRQ is received in a case in which the IRQ_EN signal is in a disabled state, the DDIC 230 according to an embodiment may configure the frequency of the TE signal to a first frequency lower than the second frequency. According to an embodiment, the IRQ_EN signal may be configured by the processor 120 to be in an enabled state or a disabled state based on a user input or a configuration of the executed application 311. According to an embodiment, the IRQ_EN signal may be configured by the processor 120 to be in the enabled state or the disabled state based on a user input or configuration of the executed application 311. According to an embodiment, the IRQ_EN signal may be configured by the DDIC 230 to be in the enabled state or the disabled state based on a user input or configuration of the executed application 311.

In operation 1020, the DDIC 230 according to an embodiment may identify whether a time during which the interrupt signal IRQ is not input is greater than a designated time while the TE signal is output at the second frequency (i.e., the maximum frequency).

According to an embodiment, the DDIC 230 may perform operation 1030 when the time during which the interrupt signal IRQ is not input is greater than a designated time REF (e.g., when the result of operation 1020 is "Yes").

According to an embodiment, when the time during which the interrupt signal IRQ is not input is less than or equal to the designated time (e.g., when the result of operation 1020 is "No"), the DDIC 230 may perform operation 1010 again.

In operation 1030, the DDIC 230 according to an embodiment may change the current frequency of the TE signal TE from the second frequency to the first frequency based on the configuration of the application 311. For example, when a touch input is not detected until the designated time elapses while the TE signal is output at the second frequency (i.e., the maximum frequency), the DDIC 230 may lower the frequency of the TE signal TE from the second frequency to the first frequency. In this case, the DDIC 230 may receive a frequency control signal from the processor 120 based on the settings of the executed application 311, and may configure the first frequency based on the received frequency control signal (e.g., the frequency control signal FC of FIG. 3).

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   a peripheral device;
   a display;
   a display driver integrated circuit (DDIC) configured to drive the display and to output a tearing effect (TE) signal having a designated frequency; and
   a processor configured to:
      control the peripheral device, the display, and the DDIC, and
      transmit image data to the DDIC in response to the TE signal,
   wherein the DDIC is configured to:
      output the TE signal at a first frequency,
      receive an interrupt signal from the peripheral device while the TE signal is output at the first frequency,
      output the TE signal at a second frequency in response to the interrupt signal, the second frequency being greater than the first frequency,
      receive image data updated by the processor based on the TE signal output at the second frequency, and
      drive the display to display the received image data.

2. The electronic device of claim 1, wherein the second frequency is a maximum frequency at which the DDIC drives the display.

3. The electronic device of claim 1, wherein the DDIC is further configured to:
   set an interrupt request enable (IRQ_EN) signal to an enabled state or a disabled state based on a user input or settings of an executed application,
   detect whether the interrupt signal is received from the peripheral device when the IRQ_EN signal is in the enabled state,
   change the frequency of the TE signal from the first frequency to the second frequency when the interrupt signal is received from the peripheral device in a state in which the IRQ_EN signal is enabled, and
   maintain the frequency of the TE signal at the first frequency when the interrupt signal is not received from the peripheral device in the state in which the IRQ_EN signal is enabled.

4. The electronic device of claim 3, wherein the DDIC is further configured to maintain the frequency of the TE signal at the first frequency regardless of the received interrupt signal when the interrupt signal is received from the peripheral device in a state in which the IRQ_EN signal is in a disabled state.

5. The electronic device of claim 4, wherein the DDIC is further configured to:

count a time during which the interrupt signal is not input while the TE signal is output at the second frequency, and change the frequency of the TE signal from the second frequency to the first frequency when the time during which the interrupt signal is not input is greater than or equal to a designated time.

6. The electronic device of claim 5, wherein the processor is further configured to determine the first frequency to be a value lower than the second frequency based on the settings of the executed application.

7. The electronic device of claim 6, wherein the first frequency is set to one frequency selected from among 1 Hz, 10 Hz, 15 Hz, 20 Hz, 24 Hz, 30 Hz, 48 Hz, 60 Hz, 90 Hz, or 96 Hz.

8. The electronic device of claim 1, wherein the peripheral device comprises at least of a touch sensor, a fingerprint sensor, an illuminance sensor, or a stylus pen included in the electronic device, or a keyboard device connected to the electronic device through near field communication (NFC).

9. The electronic device of claim 1, wherein the DDIC comprises an interrupt pin and receives the interrupt signal generated from the peripheral device through the interrupt pin.

10. A method of an electronic device including a display driver integrated circuit (DDIC) configured to output a tearing effect (TE) signal having a designated frequency and to receive image data from a processor, the method comprising:

outputting, by the DDIC, a TE signal at a first frequency;

receiving, by the DDIC, an interrupt signal from a peripheral device of the electronic device while outputting the TE signal at the first frequency;

outputting, by the DDIC, the TE signal at a second frequency in response to the interrupt signal, the second frequency being greater than the first frequency;

receiving, by the DDIC, image data updated by the processor based on the TE signal output at the second frequency; and driving, by the DDIC, a display to display the received image data.

11. The method of claim 10, wherein the second frequency is a maximum frequency at which the DDIC drives the display.

12. The method of claim 10, further comprising:

configuring, by the DDIC, an interrupt request enable (IRQ_EN) signal to be in an enabled state or a disabled state based on a user input or settings of an executed application;

detecting, by the DDIC, whether the interrupt signal is received from the peripheral device when the IRQ_EN signal is in the enabled state;

changing, by the DDIC, the frequency of the TE signal from the first frequency to the second frequency when the interrupt signal is received from the peripheral device in a state in which the IRQ_EN signal is enabled; and maintaining, by the DDIC, the frequency of the TE signal at the first frequency when the interrupt signal is not received from the peripheral device in the state in which the IRQ_EN signal is enabled.

13. The method of claim 12, further comprising:

maintaining, by the DDIC, the frequency of the TE signal at the first frequency regardless of the received interrupt signal when the interrupt signal is received from the peripheral device in a state in which the IRQ_EN signal is in a disabled state.

14. The method of claim 12, further comprising:

counting a time during which the interrupt signal is not input while the TE signal is output at the second frequency; and changing the frequency of the TE signal from the second frequency to the first frequency when the time during which the interrupt signal is not input is greater than or equal to a designated time.

15. The method of claim 14, further comprising:

determining, by the processor, the first frequency to be a value lower than the second frequency based on the settings of the executed application.

16. The method of claim 15, wherein the first frequency is set to one frequency selected from among 1 Hz, 10 Hz, 15 Hz, 20 Hz, 24 Hz, 30 Hz, 48 Hz, 60 Hz, 90 Hz, or 96 Hz.

17. The method of claim 10, wherein the peripheral device comprises at least one selected from among a touch sensor, a fingerprint sensor, an illuminance sensor, or a stylus pen included in the electronic device, or a keyboard device connected to the electronic device through NFC.

18. The method of claim 10, wherein the DDIC comprises an interrupt pin, and wherein the receiving of the interrupt signal comprises receiving the interrupt signal generated from the peripheral device through the interrupt pin.

19. An electronic device comprising:

a display configured to include a touch sensor;

a display driver integrated circuit (DDIC) configured to drive the display and to output a tearing effect (TE) signal having a designated frequency; and a processor configured to:

control the display and the DDIC, and transmit image data to the DDIC in response to the TE signal, wherein the touch sensor transmits an interrupt signal to the DDIC when a user's touch input or a hovering input to the display is detected, and wherein the DDIC is configured to:

output the TE signal at a first frequency, receive an interrupt signal from the touch sensor while the TE signal is output at the first frequency, output the TE signal at a second frequency in response to the interrupt signal, the second frequency being greater than the first frequency, receive image data updated by the processor based on the TE signal output at the second frequency, and drive the display to display the received image data.

20. The electronic device of claim 19, wherein the second frequency is a maximum frequency at which the DDIC drives the display.

* * * * *